H. G. SAAL.
SPEED GOVERNOR.
APPLICATION FILED NOV. 17, 1919.
1,352,223. Patented Sept. 7, 1920.
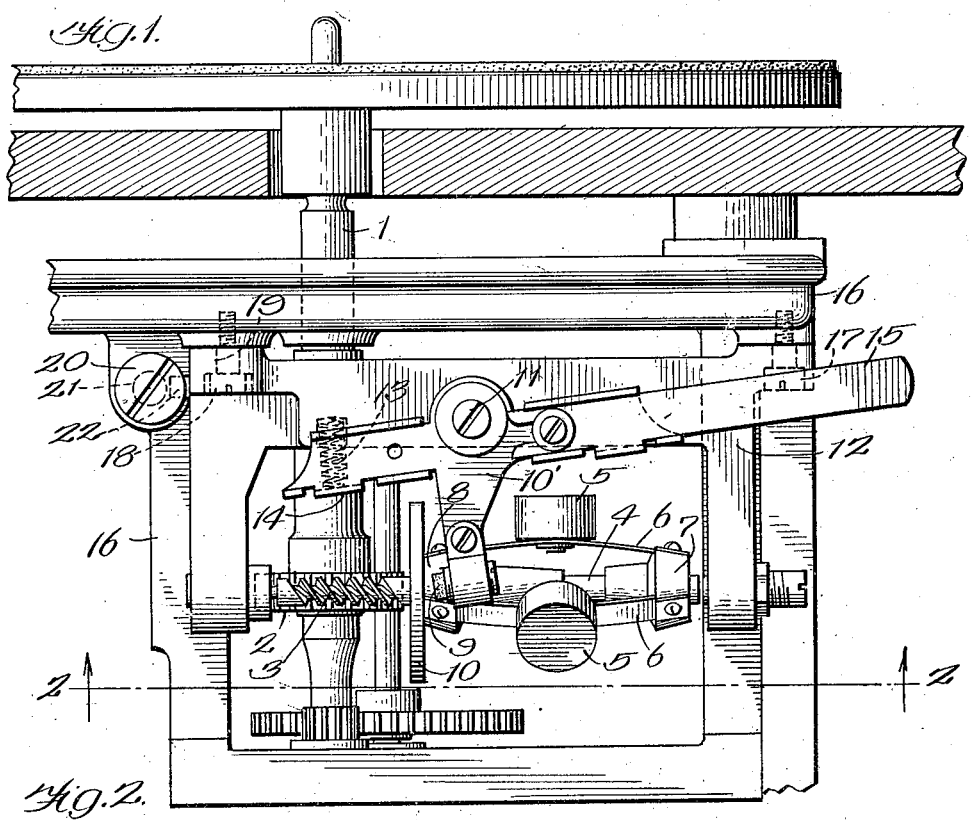
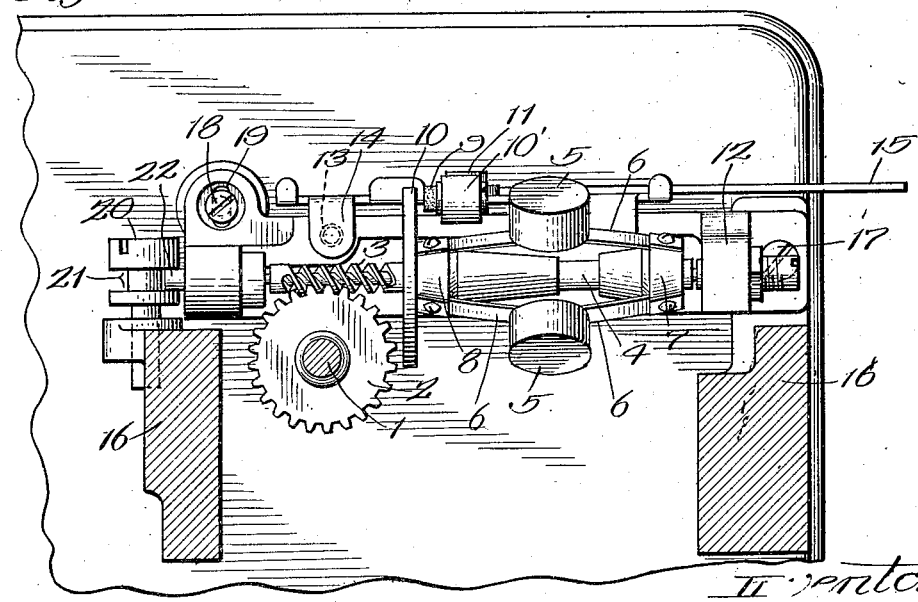
Inventor:
Henry G. Saal

UNITED STATES PATENT OFFICE.

HENRY G. SAAL, OF CHICAGO, ILLINOIS.

SPEED-GOVERNOR.

1,352,223.

Specification of Letters Patent.   Patented Sept. 7, 1920.

Application filed November 17, 1919.   Serial No. 338,553.

*To all whom it may concern:*

Be it known that I, HENRY G. SAAL, citizen of the United States, residing at Chicago, in the county of Cook and State of Illinois, have invented a certain new and useful Improvement in Speed-Governors, of which the following is a full, clear, concise, and exact description.

My invention relates to speed governors employing motor driven worm wheels that drive speed governing worm shafts, and has for its object the provision of improved means for adjusting the shaft with respect to the worm wheel.

In carrying out my invention I employ a bracket in which the worm shaft is journaled to rotate. This bracket is pivoted remotely from the worm wheel to turn upon an axis substantially parallel with the axis of the worm wheel. There is adjusting mechanism adjacent the axis of the worm wheel for turning said bracket upon its axis to effect desired adjustment of the meshing of the wheel and shaft.

I will explain my invention more fully by reference to the accompanying drawing showing the preferred embodiment thereof and in which Figure 1 is a view in elevation of a part of motor mechanism employed in the operation of a phonograph and Fig. 2 is a sectional plan view on line 2—2 of Fig. 1.

Like parts are indicated by similar characters of reference in both figures.

The governor illustrated is shown as being associated with a shaft 1 that is adapted for the operation of a turn table for supporting a disk phonographic record, this shaft supporting a worm wheel 2 engageable by a worm 3 provided upon the governor shaft 4. In accordance with common practice the shaft 1 is driven by a spring motor through gearing, the gear wheel 2 being added in order that the shaft 1 may drive the worm 3 to rotate the governor shaft 4 for the purpose of operating the centrifugal governor 5 to maintain the speed of the turn table substantially constant. This centrifugal governor is of common form, the weights thereof being mounted upon intermediate portions of the resilient strips 6. Each of these resilient strips is mounted at one end upon a sleeve 7 rigidly secured to the shaft 4, the other end of each resilient strip being connected with a collar 8 that is movable along the shaft 4 and with respect to the brake element or pad 9. The collar 8 is in fixed relation to the brake disk or rotatable brake member 10 which engages the pad 9 when the governor shaft 4 reaches a predetermined speed whereby the speed of the turn table shaft 1 is controlled.

In the embodiment of the invention illustrated the brake pad 9 constitutes the normally stationary brake member, this pad, however, being desirably mounted at one end of one arm of the bell crank 10' which is pivotally mounted at 11 to the swinging bracket 12. A spring 13 is received in a recess in the bracket 12, the projecting end of the spring engaging the ledge 14 upon the other end of the bell crank 10'. This spring operates yieldingly to hold the brake pad in its normally fixed position. A lever 15 is connected with the bell crank, the position of this lever being manually adjusted, by mechanism which need not be described, to fix the position in which the spring 13 is adapted to normally place the brake pad 9.

The governing worm shaft 4 is also mounted upon the bracket 12, all of the automatic mechanism of the governor being thus mounted upon said bracket to be movable as a unit therewith so that the relationship of the various parts of the governor is not disturbed when said bracket is swung to adjust the meshing of the worm 3 with the worm wheel 2. The bracket 12 is pivoted to the motor frame 16 by means of a pivot screw 17 which is located remotely from the shaft 1 and the worm wheel 2 on this shaft and which furnishes an axis of swinging movement for this bracket which is substantially parallel with the axis of shaft 1 and worm wheel 2. The frame 16 supports the unillustrated motor and the worm wheel 2 driven thereby in order that the swinging bracket may be adjustable with respect to the frame 16 thereby to afford adjustment for the worm shaft 3 with respect to the worm wheel. At a place close to the axis of the worm wheel is located an anchoring screw 18 which is in threaded connection with frame 16 and whose head engages a portion of the bracket 12 and whose threaded stem has engagement with the motor frame 16. The stem of screw 18 desirably passes through a slot 19 in the bracket 12, this slot being elongated on a line that substantially coincides with a circle whose center lies in the axis of screw 17.

When the screw 18 is loosened the bracket 12 may be swung to secure desired adjustment of the meshing of worm 3 with worm wheel 2 without in any way affecting the adjustment of the governing mechanism since this is all carried by the bracket and moves therewith. After the desired adjustment has been effected it is held by tightening the screw 18. In order that the swinging adjustment of the bracket 12 may be easily secured I employ an adjusting screw 20 whose stem is screwed into the motor frame 16 in a direction to have the axis of rotation of this screw transverse to the axis of swinging movement of the bracket that is defined by the screw 17.

The head of the screw 20 desirably has an annular groove 21, while the bracket 12 carries a pin 22 that enters said groove. By this arrangement the bracket 12 may readily be swung for the purpose stated, the screw 18 being loosened preparatory to adjustment and tightened when the adjustment has been effected.

While I have herein shown and particularly described the preferred embodiment of my invention, I do not wish to be limited to the precise details of construction shown as changes may readily be made without departing from the spirit of my invention, but having thus described my invention I claim as new and desire to secure by Letters Patent the following:—

1. Speed governing mechanism including a motor operated worm wheel; a frame for supporting the worm wheel; a bracket pivotally connected with said frame at a point remote from the axis of said worm wheel and affording an axis of swinging movement which is substantially parallel with the axis of said wheel; a governor mounted upon said bracket inclusive of a worm shaft in mesh with the worm wheel, a rotatable brake member upon the shaft, and a second brake member complemental to the rotatable brake member; and a lever carrying the second aforesaid brake member and itself also pivotally mounted upon said bracket.

2. Speed governing mechanism including a motor operated worm wheel; a frame for supporting the worm wheel; a bracket pivotally connected with said frame at a point remote from the axis of said worm wheel and affording an axis of swinging movement which is substantially parallel with the axis of said wheel; a governor mounted upon said bracket inclusive of a worm shaft in mesh with the worm wheel, a rotatable brake member upon the shaft, and a second brake member complemental to the rotatable brake member; a lever carrying the second aforesaid brake member and itself also pivotally mounted upon said bracket; and means adjacent the axis of the worm wheel for swinging said bracket.

3. Speed governing mechanism including a motor operated worm wheel; a frame for supporting the worm wheel; a bracket pivotally connected with said frame at a point remote from the axis of said worm wheel and affording an axis of swinging movement which is substantially parallel with the axis of said wheel; a governor mounted upon said bracket inclusive of a worm shaft in mesh with the worm wheel, a rotatable brake member upon the shaft, and a second brake member complemental to the rotatable brake member; a lever carrying the second aforesaid brake member and itself also pivotally mounted upon said bracket; and a screw threaded into the aforesaid frame and adjacent the axis of the worm wheel, this screw being transverse to the pivotal axis of the bracket and in moving engagement with the bracket.

4. Speed governing mechanism including a motor operated worm wheel; a frame for supporting the worm wheel; a bracket pivotally connected with said frame at a point remote from the axis of said worm wheel and affording an axis of swinging movement which is substantially parallel with the axis of said wheel; a governor mounted upon said bracket inclusive of a worm shaft in mesh with the worm wheel, a rotatable brake member upon the shaft, and a second brake member complemental to the rotatable brake member; a lever carrying the second aforesaid brake member and itself also pivotally mounted upon said bracket; a screw threaded into the aforesaid frame and adjacent the axis of the worm wheel, this screw being transverse to the pivotal axis of the bracket and having a head provided with an annular groove; and a pin carried by said bracket projecting into said groove whereby said bracket may be swung upon movement of said screw.

5. Speed governing mechanism including a motor operated worm wheel; a frame for supporting the worm wheel; a bracket pivotally connected with said frame at a point remote from the axis of said worm wheel and affording an axis of swinging movement which is substantially parallel with the axis of said wheel; a governor mounted upon said bracket inclusive of a worm shaft in mesh with the worm wheel, a rotatable brake member upon the shaft, and a second brake member complemental to the rotatable brake member; a lever carrying the second aforesaid brake member and itself also pivotally mounted upon said bracket; a screw threaded into the aforesaid frame and adjacent the axis of the worm wheel, this screw being transverse to the pivotal axis of the bracket and having a head provided with an annular groove; a pin carried by said bracket projecting into said groove whereby said bracket may be swung upon movement of said screw; and an anchoring screw also adjacent the axis of the worm wheel and also in threaded connection with said frame and whose head is engageable with the bracket to clamp it into adjusted position, the bracket having an opening through which the anchoring screw passes and formed to permit the bracket to be moved with respect to the anchoring screw.

In witness whereof, I hereunto subscribe my name this 30th day of October, A. D. 1919.

HENRY G. SAAL.